United States Patent [19]

Masse et al.

[11] Patent Number: 5,246,987

[45] Date of Patent: Sep. 21, 1993

[54] BITUMEN AND HALOGENATED VINYL AROMATIC-CONJUGATED DIOLEFIN BLOCK COPOLYMER COMPOSITIONS

[75] Inventors: Michael A. Masse, Richmond; James H. Collins; Daniel B. England, both of Houston, all of Tex.

[73] Assignee: Shell Oil Company, Houston, Tex.

[21] Appl. No.: 882,725

[22] Filed: May 14, 1992

[51] Int. Cl.$^5$ ............................................. C08L 95/00
[52] U.S. Cl. .................................. 524/68; 106/273.1; 106/284.2; 106/285; 106/287.35; 524/71; 525/54.5; 525/314
[58] Field of Search ................... 524/68, 71; 525/314, 525/54.5; 106/273.1, 284.2, 285, 287.35

[56] References Cited

U.S. PATENT DOCUMENTS

| | | |
|---|---|---|
| 3,576,912 | 4/1971 | Winkler . |
| 3,639,522 | 2/1972 | Narayana et al. . |
| 3,920,467 | 1/1975 | Stewart et al. .................. 106/284.2 |
| 3,978,014 | 8/1976 | van Beem et al. . |
| 4,032,491 | 6/1977 | Schoenke ............................ 524/68 |
| 4,143,221 | 3/1979 | Naarmann et al. . |
| 4,154,710 | 5/1979 | Maldonado et al. . |
| 4,330,449 | 5/1982 | Maldonado et al. . |
| 4,332,703 | 6/1982 | Lijzenga et al. ............... 106/DIG. 7 |
| 4,818,367 | 4/1989 | Winkler ........................... 106/273.1 |
| 4,868,245 | 9/1989 | Pottick et al. ....................... 525/314 |
| 4,876,130 | 10/1989 | Vonk et al. ................... 106/DIG. 7 |
| 5,039,342 | 8/1991 | Jelling .............................. 106/273.1 |

FOREIGN PATENT DOCUMENTS

| | | |
|---|---|---|
| 299499 | 1/1989 | European Pat. Off. . |
| 56-115354 | 9/1981 | Japan . |
| 62-225511 | 10/1987 | Japan . |
| 63-251448 | 10/1988 | Japan . |
| 1143895 | 2/1969 | United Kingdom . |

OTHER PUBLICATIONS

Engel et al., "Synthesis and Thermal Stability of Bitum-Polymer Ionomers", *Journal of Appl. Poly. Science*, vol. 43, pp. 227-236, (1991).
Boucher et al., "Elimination Chemistry in Asphalt", Research Report for SHRP, Southwestern Laboratories, Nov. 1989.

*Primary Examiner*—John Kight, III
*Assistant Examiner*—John M. Cooney, Jr.
*Attorney, Agent, or Firm*—Donald F. Haas

[57] ABSTRACT

A bitumen composition is provided which contains a block copolymer of one or more halogenated vinyl aromatic blocks and one or more conjugated diolefin blocks. The composition does not phase separate upon storage for five days at 160° C. and has excellent ductility and elasticity. The utilization of halogenated block copolymers also results in improved high service temperature viscosity and moduli with excellent resistance to thermal cracking at low service temperatures. The block copolymer is preferably a hydrogenated block copolymer. The bitumen is preferably halogenated.

20 Claims, No Drawings

BITUMEN AND HALOGENATED VINYL AROMATIC-CONJUGATED DIOLEFIN BLOCK COPOLYMER COMPOSITIONS

FIELD OF THE INVENTION

This invention relates to bitumen compositions comprising bitumen and halogenated block copolymers of vinyl aromatics and hydrogenated conjugated diolefins.

BACKGROUND OF THE INVENTION

Bitumen is used in paving, roofing, joint compound adhesives and other applications. Bitumen is an inexpensive material for these uses, but has many shortcomings, including low flexibility at low service temperatures and low modulus at high service temperatures. These properties as well as rut resistance and cold flow would be improved if service temperature viscosities could be increased for compositions with similar processing temperature viscosities. Some of these deficiencies in physical properties may be at least partially overcome by including in the bitumen composition various elastomeric polymers such as styrenic copolymers.

Many asphalts are not compatible with styrenic copolymers such as styrene-butadiene-styrene (SBS) copolymers, hydrogenated versions thereof (SEBS) or styrene-butadiene rubbers (SBR). Such incompatible blends exhibit phase instability which manifests itself in bulk phase separation such as may occur in bulk storage at relatively high temperatures. Upon standing for long periods of time, a polymer rich (asphaltene lean) phase forms in the upper layers and a polymer lean (asphaltene rich) phase forms at the bottom. Generally, in such asphalts one also observes a coarse dispersion of the polymer and relatively poor physical properties Several problems then result. The dispersion requires constant agitation to maintain a relatively homogeneous mixture. Phase separation may also occur with time under service conditions encountered in field applications such as road paving, roofing or other industrial applications Also, in such cases, more polymer is often required to effect the desired improvements in physical properties of the polymer/bitumen blends.

Various approaches have been tried to increase the compatibility of these blends. For example, U.K. patent specification 1,143,895 teaches adding carbon black to such blends to get increased properties such as elongation at break, tensile stress at 300% elongation and tensile stress at break. However, the compatibility of these compositions, as measured by the amount of phase separation during hot storage of the composition, is deficient because such blends are still thermodynamically unstable. Also, polystyrene has been added to these blends, as described in U.S. Pat. No. 3,978,014, to increase their compatibility. Only certain bitumens may be utilized in such compositions due to the inherent incompatibility between bitumens and block copolymers. In order to achieve compatibility a significant amount of polystyrene must be present and this increases the cost of the bitumen blend without improving ductility or flexibility.

It is therefore an objective of the present invention to provide compositions of bitumen and block copolymers which are compatible and thus exhibit hot storage stability and improved viscoelastic properties. Excellent viscoelastic properties include lower viscosities at similar processing temperatures and equivalent or higher viscosity and elasticity at high service temperatures.

SUMMARY OF THE INVENTION

Bitumen compositions are provided comprising 100 parts by weight bitumen and from 0.5 to 30 parts by weight of a block copolymer wherein the block copolymer comprises at least one hydrogenated conjugated diolefin block and at least one vinyl aromatic block wherein the vinyl aromatic block contains nuclear halogen. These compositions have excellent hot storage stability and have service temperature viscosities which are considerably higher than bitumen compositions which contain similar nonhalogenated block copolymers. The higher service temperature viscosities result in less rutting and less cold flow. These compositions also have excellent ductility and elastic recovery.

In a preferred embodiment of the present invention, the asphalt itself is halogenated. This enhances the low temperature properties of the blend as well as increasing the viscosity and elasticity at high service temperatures while only modestly increasing the viscosity at processing temperatures.

DETAILED DESCRIPTION OF THE INVENTION

The bitumen of the present invention may have properties which vary widely, depending on the desired properties of the finished product. Suitable bitumens may have softening points of between about 80° F and about 220° F. and preferably between about 90° F. and about 120° F. They may have a PEN from 500 to 20. The bitumen may be residues from distillation of straightrun crude oil, produced by cracking straight run or cracked residue, blowing a crude oil or residues of crude oil distillation or extracts of crude oils, bitumens derived from coal tars, propane bitumens, butane bitumens, pentane bitumens or mixtures thereof Bitumen may also be referred to as asphalt or flux.

The block copolymers useful in the process of this invention may have a linear or a radial configuration. Radial configuration polymers are also known as star polymers, and have a plurality of polymeric arms extending from a central coupling agent. The arms may be identical or may differ in molecular weight and/or structure. The number of arms may vary from 3 to more than 50.

The polymers which may be used according to the present invention are block copolymers of conjugated dienes and vinyl aromatic hydrocarbons. Such block copolymers may be multiblock copolymers of varying structures containing various ratios of conjugated dienes to vinyl aromatic hydrocarbons including those containing up to about 50% or more by weight of vinyl aromatic hydrocarbon. Thus, multiblock copolymers may be utilized which are linear or radial, symmetric or asymmetric, and which have structures represented by the formulae, A-B, A-B-A, A-B-A-B, B-A, B-A-B, B-A-B-A, (A-B)$_{0, 1, 2, ...}$B-A and the like wherein A is a polymer block of a vinyl aromatic hydrocarbon and B is a polymer block of a conjugated diene. It is not necessary but B can be a polymer block of a conjugated diene that has been hydrogenated.

The block copolymers may be produced by any well known block polymerization or copolymerization procedures including the well-known sequential addition of monomer techniques, incremental addition of monomer technique or coupling technique as illustrated in, for example, U.S. Pat. No. Nos. 3,251,905, 3,390,207, 3,598,887 and 4,219,627 which are herein incorporated by reference. As is well known in the block copolymer art, tapered copolymer blocks can be incorporated in the multiblock copolymer by copolymerizing a mixture of conjugated diene and vinyl aromatic hydrocarbon monomers utilizing the difference in their copolymerization reactivity rates. Various patents describe the appropriation of multiblock copolymers containing tapered copolymer blocks including U.S. Pat. Nos. 3,251,905, 3,265,765, 3,639,521 and 4,208,356 which are herein incorporated by reference.

Conjugated dienes which may be utilized to prepare the polymers and copolymers include those having from 4 to 8 carbon atoms and also include 1,3-butadiene,2-methyl-1,3-butadiene(isoprene),2,3-dimethyl-1,3-butadiene, 1,3-pentadiene, 1,3-hexadiene and the like. Mixtures of such conjugated dienes may also be used. The preferred conjugated dienes are 1,3-butadiene and isoprene.

Vinyl aromatic hydrocarbons which may be utilized to prepare copolymers include styrene, o-methylstyrene, p-methylstyrene, p-tertbutylstyrene, 2,4-dimethylstyrene, alpha-methylstyrene, vinylnaphthalene, vinylanthracene and the like. The preferred vinyl aromatic hydrocarbon is styrene.

It is preferred that the A blocks have a molecular weight from 5000 to 35,000 each while the block B should each have a molecular weight from 20,000 to 300,000. It is more preferred that the A blocks each have a molecular weight from 7,500 to 30,000, and each B block has a molecular weight from 30,000 to 150,000. It is most preferred that the A blocks each have a molecular weight from 10,000 to 20,000, and each B block has a molecular weight from 45,000 to 75,000. The overall molecular weight can range from 50,000 to 325,000. These molecular weights are peak molecular weights of the predominant species measured by gel permeation chromatography (GPC).

The present invention works with both unhydrogenated and hydrogenated polymers. Hydrogenated ones are preferred in certain circumstances. While unhydrogenated diene polymers have a number of outstanding technical advantages, one of their principal limitations lies in their sensitivity to oxidation. This can be minimized by hydrogenating the copolymers, especially in the diene blocks. The hydrogenation of these polymers and copolymers may be carried out by a variety of well established processes including hydrogenation in the presence of such catalysts as Raney Nickel, nobel metals such as platinum, palladium and the like and soluble transition metal catalysts. Titanium biscyclopentadienyl catalysts may also be used such as disclosed in U.S. Pat. No. 5,039,755, which is herein incorporated by reference. Suitable hydrogenation processes which can be used are ones wherein the diene-containing polymer or copolymer is dissolved in an inert hydrocarbon diluent such as cyclohexane and hydrogenated by reaction with hydrogen in the presence of a soluble hydrogenation catalyst. Such processes are disclosed in U.S. Pat. Nos. 3,113,986, 4,226,952 and Reissue 27,145, the disclosures of which are herein incorporated by reference. The polymers are hydrogenated in such a manner as to produce hydrogenated polymers having residual unsaturation content in the polydiene block of less than about 20%, and preferably as close to zero percent as possible, of their original unsaturation content prior to hydrogenation.

Particularly suitable block copolymers, prior to hydrogenation, which may be employed for the present purpose include the following species:
Polystyrene-polyisoprene-polystyrene
Polystyrene-polybutadiene-polystyrene
Triblock copolymers such as these are preferred because of the ability of the vinyl aromatic end blocks to form glassy domains which tie together the rubber mid blocks. The glassy domains act as physical crosslinks and impart excellent elastomer properties much like vulcanized rubbers, but because these domains turn fluid above their glass transition temperature, they are easily processed.

The minimum amount of block copolymer in bitumen compositions is 0.5 parts by weight based on 100 parts by weight of bitumen because lesser amounts have a tendency to not form the hard vinyl aromatic domains. The existence of these domains is required for the rubber to impart improved properties to the bitumen composition. The maximum amount of block copolymer is usually 30 parts by weight per 100 parts by weight of bitumen. Higher levels of block copolymer can cause the composition to be relatively expensive and also excessively increase the processing temperature viscosity of the finished composition. The amount of block copolymer more preferred for paving applications is from about 1 to 10 parts because such blends have dramatically improved material properties, are more economical and retain good processability.

The halogenation of the polymer may be on both vinyl aromatic and conjugated diolefin blocks, but there must be nuclear halogenation in order for the halogen to have maximum effect on storage stability. Nuclear halogenation refers to halogens which are bonded to a carbon of an aromatic ring. This location for the halogen is important because the aromatic portions of the polymers are then most compatible with the bitumen. Further improving the compatibility of the aromatic portions of the polymer by introducing nuclear halogens has a greater effect on the compatibility of the components than halogens which are grafted to the conjugated diolefin blocks. Further, halogenation of the vinyl aromatic blocks does not significantly reduce the elastomeric properties of the polymer, like introducing halogens into the rubbery blocks could. Retaining these elastomeric properties results in the polymer imparting greater elasticity and durability to the bitumen composition.

Nuclear halogenation of the block copolymers may be performed by any of the methods known in the prior art to graft halogens to aromatic rings. Metalation and then reaction with halogens can incorporate halogens onto the aromatic rings in amounts up to 1.0 halogen per aromatic ring. Metalation, or reaction of the polymer with a metal alkyl to produce an alkane and metal ion grafted to the polymer, is taught by U.S. Pat. No. 4,868,245, incorporated herein by reference. Contacting the metalated polymer with a halogen, such as ClBr, $Cl_2$ or $Br_2$, will result in a halogenated polymer where a portion of the halogens are nuclear halogens and the halogenation is essentially all incorporated within the vinyl aromatic blocks. The level of halogenation achievable by this mechanism is limited by the tendency of this process to degrade the base polymer and by the tendency for heavily metalated intermediate to form a gel.

A preferred method to graft halogens onto aromatic rings is taught by U.S. Pat. No. 4,352,909, incorporated herein by reference. This process utilizes bromine chloride as a halogenation agent in the presence of a Lewis acid catalyst in a halogenated hydrocarbon solvent. Three bromines per aromatic ring may be grafted by this process. The Lewis acid catalysts are Friedel-Crafts catalysts such as antimony trichloride. Other Friedel-Crafts catalysts, such as aluminum trichloride, also are acceptable. Chlorinated hydrocarbon solvents are preferred because these Friedel-Crafts catalysts have good solubility in these systems. We have found that the halogenation may also be performed in aliphatic solvents such as cyclohexane, and normal hexane and ethers such as tetrahydrofuran although the effectiveness of the catalyst is somewhat reduced.

An improvement to the Friedel-Crafts catalyzed halogenation process is taught in U.S. Pat. No. 4,200,703, incorporated herein by reference. The improvement comprises addition of 0.02 to 2 moles, per mole of Lewis acid, of a nucleophilic substance which acts as a Lewis base for the Lewis acid. This Lewis base reduces the tendency of the brominated polymer to form a gel. Because halogenated polymers with more than an average of about two halogens per aromatic ring have a tendency to gel in solutions and become difficult to process, this improvement is preferred when the level of halogenation equals or exceeds two halogens per aromatic ring.

Preferred halogenated block copolymers for use herein are described in copending, commonly assigned application Ser. No. 574,170, filed Aug. 27, 1990 and titled "Block Copolymer of Polyalkylene and Halogenated Poly(Vinyl Aromatic)." These block copolymers have the formula

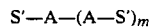

$$S'-A-(A-S')_m$$

in which m is 0, 1, 2, 3 or 4, A is a saturated polyalkylene and S' is a nuclear brominated polystyrene having from 0.5 to 5 bromines per styrene unit. These polymers may be made according to one of the previously discussed methods but preferably are made by starting with a vinyl aromatic-saturated polyalkylene block copolymer and then halogenating it with a halogenation agent, for example bromine chloride, in the presence of a catalyst, such as a Lewis acid.

The halogen of this invention is preferably bromine, although other halogens, and chlorine in particular, also improve compatibility of the block copolymer with bitumen. The most preferred halogen is bromine because in addition to increasing the compatibility with bitumen, flame retardancy properties are imparted by bromination of polymers. Chlorine and bromine are preferred halogens due to the wide commercial availability at reasonable cost.

The amount of halogenation which is effective in providing a compatible composition varies between bitumens. Bitumens which can be characterized as being more polar will require the block copolymer to be halogenated to a higher level. Generally, from 1.0 to 25 weight percent, preferably 2 to 20, based on the weight of the block copolymer, of nuclear halogen is required because lower levels are not as effective and higher levels of halogenation add unnecessarily to the cost of the product.

The cost of producing the composition of this invention may be reduced by utilizing a mixture of halogenated and unhalogenated block copolymer. A ratio of from 1:3 to 4:1 of halogenated to unhalogenated block copolymer may be incorporated if the halogen content of the halogenated block copolymer is from 2 to 20 weight percent. More preferably, a ratio between 1:1 and 4:1 is preferred because depending on the chemistry of the base asphalt the minimum amount of the halogenated block copolymer required to effect stability may have to be adjusted to higher levels. Amounts higher than 4:1 simply add to the cost of the blend without any substantial benefit.

We have used the above block copolymers to effect remarkable improvement in service properties by first halogenating the base asphalt. Halogenation improves the base asphalt itself in terms of temperature susceptibility. The addition of the halogenated polymer to the halogenated base asphalt results in dramatic non-additive increases in viscoelastic material properties (i.e. the storage and loss moduli) at high service temperatures. Only modest increases in viscosity at processing temperatures (about 150° C.) occur. Further, the low temperature properties are also enhanced. It is theorized that these improvements occur because the improved solubility results in a more finely dispersed polymeric network which in turn effects improved efficiency.

The amount of halogenation of the base asphalt which is necessary to achieve these enhanced results depends upon the character of the base asphalt itself. Again, bitumens which can be characterized as being more polar will require a greater level of halogenation. Generally, from 0.1 to 5, preferably from 0.1 to 3, weight percent of halogen should be added to the asphalt because lower levels are ineffective and higher levels will eventually lead to poorer low temperature properties and embrittlement.

The asphalt is brominated by addition of elemental bromine or BrCl in the presence of a catalyst or accelerator or by simple addition of liquid bromine alone. The asphalt and polymer may be brominated separately (and blended together) or at the same time in situ.

The halogenated block copolymer and bitumen are preferably mixed under high shear at an elevated temperature. Temperatures between 130° C. and 250° C. are preferred. Higher temperatures can degrade the polymers. At lower temperatures the composition is excessively viscous and difficult to mix. Other methods which can be used include solvent blending, back blending with concentrates and low shear blending at elevated temperatures with aromatic oils.

Fillers, for example silica and calcium carbonate, stabilizers, antioxidants, pigments, and solvents are known to be useful in bitumen compositions and can be incorporated in the composition of this invention in concentrations taught in the art. Polystyrene, functionalized liquid resins and nonfunctionalized liquid resins are also known as advantageous ingredients in bitumen compositions and may be included in the composition taught herein.

The use of halogenated block copolymers, as opposed to unhalogenated block copolymers, in halogenated and unhalogenated bitumen compositions results in a composition with excellent hot storage stability. The composition also has excellent ductility, thermal stability and elongation. The most surprising improvement which results from the use of nuclear halogenated vs. nonhalogenated vinyl aromatic and conjugated diolefin block copolymers in bitumen compositions is the increase in high service temperature viscosity. This indicates an improvement in rut resistance and cold flow resistance.

EXAMPLE I

A hydrogenated block copolymer of styrene and butadiene (SEBS) was brominated to a level of 15 percent by weight bromine, essentially all grafted to the aromatic rings. The block copolymer had about 29 percent by weight styrene, a molecular weight of about 68,000 (peak MW by GPC) prior to bromination. The block copolymer was brominated in a methylene chloride solvent using an antimony trichloride catalyst and bromine chloride as a halogenation agent.

A bitumen composition according to this invention was prepared by blending 5 parts by weight of the brominated block copolymer with 95 parts by weight of a bitumen. The bitumen was a vacuum flashed crude oil residue having a penetration value between 100 and 150 (Shell Wood River AC-5 asphalt). The blend was mixed in a high shear mixer at 3300 rpm at 180° C.

The storage stability of the blend was determined by placing a sample of the blend in a pint can, blanketing the head space with nitrogen and sealing the can. The can was then held at 160° C. for five days. After being held at 160° C., the can was cooled, and the can was then cut away from the solidified bitumen. A bitumen with excellent storage stability will show no phase separation. With an incompatible block copolymer, the bitumen will separate into a polymer rich phase and a polymer lean phase. The sample of the bitumen composition of the present example showed no signs of phase separation.

The ductility of the sample was determined to be 15 cm at 5 cm/min. at 39.2° F. The elastic recovery was determined by a procedure which starts with the method for preparing a specimen as in the standard ductility test. The specimen is pulled to 10 centimeters, clipped in the center and allowed to remain in the bath at the test temperature for one hour. The sample is placed back in the carriage and the carriage is moved until the ends touched. The distance in centimeters is recorded as A. This value is inserted into the following equation to determine the percent recovery:

Percent Recovery = $[((10-A)/10) \times 100]$

The Brookfield viscosity of the composition was determined at various temperatures from 60° C. to 160° C.

Comparative Examples C1 and C2 were prepared in the same manner as the example above, but different polymers were utilized. Comparative Example C1 was prepared utilizing the block copolymer of the above example but without bromination. Comparative Example C2 utilized an unhydrogenated styrene-butadiene triblock copolymer having a weight average molecular weight of about 181,000 and containing about 31 percent by weight of styrene in approximately equally sized endblocks.

The properties which were determined for the example above were also determined for the two comparative examples. Table 1 summarizes the properties of the Example and comparative examples.

TABLE 1

| Polymer/Bitumen Blend | Example I | C1 | C2 |
|---|---|---|---|
| Polymer | 15% wt | non brominated | non brominated |

TABLE 1-continued

| Polymer/Bitumen Blend | Example I | C1 | C2 |
|---|---|---|---|
| | brominated C1 | hydrogenated | unhydrogenated |
| Storage Stability | OK | Phase Separated | Phase Separated |
| Ductility, cm (5 cm/min at 39.2° F.) | 15 | 6.5 | 29.0 |
| Elastic Recovery, % (1 hour at 39.2° F.) | 65 | Fail | 62.5 |
| Viscosity, cp at | | | |
| 160° C. | 545 | 475 | 460 |
| 150° C. | 845 | 715 | 620 |
| 135° C. | 1,940 | 1,400 | 1,180 |
| 120° C. | 5,200 | 3,310 | 2,650 |
| 100° C. | 18,750 | 9,600 | 9,600 |
| 90° C. | 44,800 | 19,600 | 21,400 |
| 80° C. | 121,000 | 49,600 | 55,500 |
| 70° C. | 406,000 | 158,000 | 166,000 |
| 60° C. | 1,560,000 | 544,000 | 575,000 |

The polymer/bitumen mixture of the invention, Example I, was stable at the end of the storage stability whereas the blends of the comparative examples exhibited a very high degree of phase separation. The Example I blend has a viscosity at 60° C. of 2.7 and 2.8 times the viscosities of the blends of the comparative examples. At 160° C., the viscosities varied only by a fraction. This differential viscosity at service temperatures is valuable due to the improvements in cold flow and rutting resistance that higher service temperature (~60° C.) viscosities indicate.

EXAMPLE II

The storage stabilities of blends of the polymers used in Example I with three different types of asphalts at varying concentrations were determined. The other two asphalts were Shell Woodriver AC-20 and Amoco Savannah AC-6 which are asphalts which are slightly higher than the AC-5 in the concentration of polars and asphaltenes. The blends were prepared and the storage stability determined according to the methods described in Example I. The results are shown in Table 2 below.

TABLE 2

| Asphalt | Polymer/Bitumen Blend | Polymer Concentration, % wt | Storage Stability |
|---|---|---|---|
| AC-5 | C2 | 5 | Phase Separated |
| | C1 | 5 | Phase Separated |
| | 15% Br C1 | 5 | OK |
| | C1/15% Br C1 | 2.5/2.5 | OK |
| AC-20 | C1 | 3 | Phase Separated |
| | 15% Br C1 | 3 | OK |
| | C1 | 6 | Phase Separated |
| | 15% Br C1 | 6 | OK |
| AC-6 | C1 | 6 | Phase Separated |
| | 15% Br C1 | 6 | OK |

It can be seen from the above table that all of the polymer/bitumen blends wherein the polymer was not brominated exhibited phase separation at the end of the storage stability test. In contrast, all of the examples wherein brominated polymer was used in the blend exhibited no phase separation and the storage stability was acceptable.

EXAMPLE III

A sample of the Shell Woodriver AC-5 asphalt was brominated according to the following procedure. The original 5 gallon can with asphalt was heated at 275° F. for 5 hours. The asphalt was immediately poured into 3 one gallon cans and 6 one quart cans. The 5% bromination reaction was accomplished by heating Shell AC-5 asphalt (708.67 g) to about 85° C. (75° to 90° C.) and adding 12.0 mL (37.30 g, 5% by weight of asphalt) of liquid bromine dropwise from an addition funnel. The reaction mixture was mechanically stirred during addition and afterward for a total reaction time of 1 hour The reaction was purged continuously with nitrogen A white vapor (HBr) was evolved during the reaction and some brown (Br$_2$) vapor was lost. The final asphalt contained about 1% bound bromine by weight. Bound bromine was determined by inductive plasma emission and mass spectroscopy coupled with gel permeation chromotography. These results were confirmed by Xray fluorescence.

The following tables show the results of various comparative experiments which were done using the above 5% brominated AC-5 asphalt and polymers C1 and 15% Br C1. In Table 3, the complex modulus (G*) and the storage modulus (G') were determined for various asphalts and blends thereof. G* is a measure of total resistance to deformation and G' is a measure of recoverable deformation. Together, they approximate the resistance of these blends to deformation and higher numbers mean more improved performance by reducing the tendency to rut.

TABLE 3

| Blend Designation | Temperature (°C.) | G* (Pa) | G' (Pa) |
| --- | --- | --- | --- |
| AC-5 | 25 | 31,000 | 7,400 |
|  | 40 | 2,000 | 170 |
|  | 60 | 60 | <1 |
|  | 80 | <1 | <1 |
| 5% Br AC-5 | 25 | 153,000 | 85,100 |
|  | 40 | 15,900 | 6,125 |
|  | 60 | 540 | 91 |
|  | 80 | 16 | <1 |
| C1 + AC-5 | 25 | 107,000 | 58,900 |
|  | 40 | 13,800 | 6,400 |
|  | 60 | 800 | 240 |
|  | 80 | 61 | 30 |
| 15% Br C1 + AC-5 | 25 | 99,900 | 51,300 |
|  | 40 | 11,600 | 5,400 |
|  | 60 | 800 | 400 |
|  | 80 | 97 | 74 |
| 15% Br C1 + 5% Br AC-5 | 25 | 341,900 | 247,000 |
|  | 40 | 53,040 | 37,940 |
|  | 60 | 4,800 | 2,900 |
|  | 80 | 324 | 131 |

It can be seen that the AC-5 has relatively high moduli at low temperatures but that as the temperature increases, the moduli fall off to very low values. The brominated AC-5 shows considerable improvement in higher values for both G* and G' at elevated temperatures (>60° C.). The standard blend, representative of the prior art of C1 and AC-5 has yet higher moduli at the higher temperatures. Using the 15% brominated polymer in place of the unbrominated polymer further increases the moduli at elevated temperatures (>60° C.). However, using the brominated polymer and the brominated asphalt dramatically increases the moduli. The temperature susceptibility can then be adjusted by varying the composition and/or bromination level of the base asphalt and/or by varying the bromination level and/or concentration of the brominated block copolymer.

Table 4 contains a comparison of various physical properties of polymer asphalt blends using AC-5. It can be seen that the blend containing the brominated polymer and the brominated asphalt has a dramatically higher viscosity at high service temperatures but only a fractionally higher viscosity at processing temperatures than the blends of the other polymers with unbrominated AC-5.

TABLE 4

| Blend Designation | 5% w BrC1 + BrAC-5 | 5% w BrC1 + AC-5 | 5% w C1 + AC-5 | 5% w C2 + AC-5 |
| --- | --- | --- | --- | --- |
| Physical Property |  |  |  |  |
| Ductility (@ 5 cm/min, 4° C.), cm | 10.5 | 15 | 7 | 29 |
| Elastic Recovery (@ 1 hr. 4° C.), % | 70 | 65 | Fail | 63 |
| Brookfield Viscosity, cps |  |  |  |  |
| @ 70° C. | 1,160,000 | 406,000 | 158,000 | 166,000 |
| @ 80° C. | 306,000 | 121,000 | 49,600 | 55,500 |
| @ 90° C. | 104,000 | 44,800 | 19,600 | 21,400 |
| @ 100° C. | 42,400 | 18,750 | 9,600 | 9,600 |
| @ 120° C. | 9,920 | 5,200 | 3,300 | 2,700 |
| @ 135° C. | 3,200 | 1,900 | 1,400 | 1,200 |
| @ 150° C. | 1,200 | 845 | 715 | 620 |
| @ 160° C. | 640 | 545 | 475 | 460 |

The low temperature properties of various blends were determined. It can be seen that the blend of the brominated polymer and the brominated asphalt has the lowest critical thermal cracking temperature.

TABLE 5

| Blend Designation | AC-5 | AC-20 | BrAC-5 | BrAC-5 + 5% w BrC1 |
| --- | --- | --- | --- | --- |
| Physical Properties |  |  |  |  |
| Penetration (@ 4° C., 100 g, 5 sec), dmm | 11 | 3 | 9 | 5 |
| Penetration (@ 4° C., 200 g, 60 sec), dmm | 41 | 20 | 28 | 20 |
| Critical Thermal Cracking Temperature, °C. | −38.8 | −33.7 | −37.2 | −42.4 |

Hence, the best balance of both high and low temperature properties (temperature susceptibility) is achieved by using the combination of a brominated asphalt and brominated polymers.

EXAMPLE IV 5 wt % brominated samples of polymers C1 and C2 were combined with 1 wt % and 3 wt % brominated AC-5 asphalt as described below in Table 6 and the viscosities of the blends were measured at increasing temperatures. It can be seen that the lower molecular weight polymer, C1, performed better than the other in that the low temperature viscosity of C1 was higher and the high temperature viscosity was lower. However, both performed well. The C1 samples with 1% and 3% brominated asphalt performed very similarly to each other and very favorably as compared with the 5% brominated asphalt sample shown in Table 4.

| Example | A<br>5% w BrC1 +<br>1% w<br>BrWRAC5 | B<br>5% w BrC1 +<br>3% w<br>BrWRAC5 | C<br>5% w BrC2 +<br>3% w<br>BrWRAC5 |
|---|---|---|---|
| Brookfield Viscosity, cps @ | | | |
| 70° C. | 1,490,000 | 1,470,000 | 870,000 |
| 80° C. | 436,000 | 378,000 | 276,000 |
| 90° C. | 134,000 | 129,000 | 77,600 |
| 100° C. | 50,800 | 42,100 | 28,700 |
| 110° C. | 23,700 | 23,700 | 13,800 |
| 120° C. | 12,100 | 11,400 | 7,120 |
| 130° C. | 5,920 | 5,440 | 3,920 |
| 135° C. | 4,160 | — | — |
| 140° C. | 2,880 | 2,720 | 2,240 |
| 150° C. | 1,520 | 1,440 | 1,440 |
| 160° C. | 880 | 800 | 960 |

We claim:

1. A storage stable bitumen composition comprising 100 parts by weight of bitumen and at least 0.5 parts by weight of a block copolymer comprising at least one block of conjugated diolefin monomer units and at least one block of vinyl aromatic monomer units, wherein the block copolymer contains at least 1.0 wt %, based on the weight of the block copolymer, of nuclear halogen.

2. The composition of claim 1 wherein the block copolymer is hydrogenated.

3. The composition of claim 1 wherein the block copolymer comprises from 0.5 to 30 parts by weight of the composition.

4. The composition of claim 3 wherein the amount of the block copolymer is from 1 to 10 parts by weight.

5. The composition of claim 1 wherein the block copolymer is of a linear alternating block structure.

6. The composition of claim 5 wherein the block copolymer is a triblock copolymer having vinyl aromatic end blocks and a hydrogenated conjugated diolefin midblock.

7. The composition of claim 1 wherein the composition further comprises a second block copolymer comprising at least one block comprising hydrogenated conjugated diolefin monomer units and at least two blocks which comprise vinyl aromatic monomer units wherein the second block copolymer is essentially free of nuclear halogen.

8. The composition of claim 7 wherein the ratio of the halogenated block copolymer to the second block copolymer is in the range of 1:3 to 4:1.

9. The composition of claim 8 wherein said ratio is from 1:1 to 4:1.

10. The composition of claim 1 wherein the halogen is bromine.

11. The composition of claim 1 wherein the vinyl aromatic monomer is styrene.

12. The composition of claim 1 wherein the conjugated diolefin is selected from the group consisting of butadiene, isoprene and mixtures thereof.

13. The composition of claim 1 wherein the halogen is chlorine.

14. The composition of claim 1 wherein the bitumen contains 0.1 to 5% by weight of nuclear halogen.

15. The composition of claim 14 wherein the bitumen contains from 0.1 to 3% by weight of nuclear halogen.

16. The composition of claim 14 wherein the nuclear halogen and the halogen in the bitumen are bromine.

17. The composition of claim 14 wherein the block copolymer is hydrogenated.

18. The composition of claim 6 wherein the vinyl aromatic monomer is styrene.

19. The composition of claim 6 wherein the conjugated diolefin is selected from the group consisting of isoprene, butadiene and mixtures thereof.

20. The composition of claim 1 wherein the block copolymer contains from 2 to 20 wt % of nuclear halogen.

* * * * *